United States Patent [19]

Shane

[11] 4,040,071

[45] Aug. 2, 1977

[54] METHOD AND APPARATUS FOR MAKING STEREOSCOPIC PICTURES

[76] Inventor: Bruce Shane, 9039 Sligo Creek Parkway No. 1711, Silver Spring, Md. 20901

[21] Appl. No.: 560,132

[22] Filed: Mar. 20, 1975

[51] Int. Cl.² .............................................. G03B 35/08
[52] U.S. Cl. .................................................. 354/113
[58] Field of Search ................. 354/113, 125, 112, 236

[56] References Cited

U.S. PATENT DOCUMENTS

| | | | |
|---|---|---|---|
| 1,991,924 | 2/1935 | Dolan | 354/125 |
| 2,458,466 | 1/1949 | Campbell | 354/113 |
| 2,609,738 | 9/1952 | Staehlin | 354/113 |
| 2,807,990 | 10/1957 | Perlin | 354/112 |
| 2,891,458 | 6/1959 | Grimal | 354/294 |
| 3,608,458 | 9/1971 | Ratliff | 354/113 |

*Primary Examiner*—Donald A. Griffin
*Attorney, Agent, or Firm*—Wigman & Cohen

[57] ABSTRACT

The invention relates generally to stereo photography and particularly to a simple method and apparatus which enables an unskilled individual to produce three-dimensional stereoscopic pictures through the use of inexpensive, readily available cameras and viewing devices. In the practice of the invention, two cameras are mounted in an adjacent vertical orientation in a novel housing or holder, interaxial spacing between the cameras being either fixed or adjustable within defined limits to produce slide transparencies croppable according to the invention and mountable on available reel mounts for viewing with standard viewing devices.

9 Claims, 8 Drawing Figures

METHOD AND APPARATUS FOR MAKING STEREOSCOPIC PICTURES

BACKGROUND AND SUMMARY OF THE INVENTION

Stereoscopic photography, although well-known in the art, is relatively complicated and expensive to practice on a small scale. One approach calls for a special 35mm steroscopic camera. As an alternative, two 35mm cameras are employed in a side-by-side horizontal orientation to produce two slide transparencies taken simultaneously with a particular interaxial spacing. For such "two-camera" stereophotography, the slide transparencies must then be "cropped, " i.e., cut and trimmed for fitting into a viewing mount. Care must be taken in insuring that homologous points, or identical points, on the transparencies, will be properly aligned on fitting into the mount. A substantial expertise has previously been necessary to accomplish this task.

According to the present invention, it has been found that stereoscopic photography can be practiced by an unskilled individual using relatively inexpensive and readily available equipment. Particularly, it has been found that the relatively small "pocket sized" cameras, referred to as 110 cameras and which are available commercially inter alia as the Kodak Instamatic 10, 20, 30, and 40 series, as the Minolta Pocket Auto-Pak 70 series, and as the Keystone Pocket-Matic 20 series, can be used to produce slide transparencies when used in a two-camera holder constructed according to the present invention. The two slide transparencies produced by the use of such inexpensive and readily available cameras can then be cropped and fitted to standard reel mounts, such as the commercially available View-Master reel mounts, by an individual who is unskilled and working without specialized equipment. According to the invention, the slide transparencies are cropped such that the alignment of homologous points need not be considered, the cropped transparencies then being mounted on a standard reel mount for viewing with commercially available "3-D" viewing devices, such as the commercially available View-Master 3-D viewer.

Certain novel features of the present method and apparatus enable an unskilled amateur to produce stereoscopic pictures without expensive and complicated special equipment.

Accordingly, it is a primary object of the invention to provide a method and apparatus for making stereoscopic photographs with relatively uncomplicated and inexpensive equipment.

Another object of the invention is to provide a method and apparatus for making stereoscopic photographs which enables an unskilled individual to produce stereoscopic photographs.

Further objects and advantages of the present invention will become apparent in light of the following description of the preferred embodiment.

DESCRIPTION OF THE PREFERRED EMBODIMENTS

The present method and apparatus allows an unskilled amateur to produce mounted stereo photographs with low cost, commercially available fixed-focus cameras and with standard reel mounts used with standard viewers typically made and sized for transparencies produced from more expensive variable-focus cameras. The present invention provides for the first time the ability to both the skilled professional practitioner and the unskilled amateur to inexpensively produce slide transparencies with fixed-focus cameras, such as the "110" cameras, and then to mount the transparencies in stnadard 3-D reel mounts which are sized for slide transparencies produced by more expensive variable-focus cameras, usually of the 35mm type. The slide transparencies produced with the apparauts of the invention can be cropped according to the method of the invention to fit these standard 3-D reel mounts without the necessity for aligning homologous points on the transparencies, a task performable only by a skilled technician.

Figure 1:
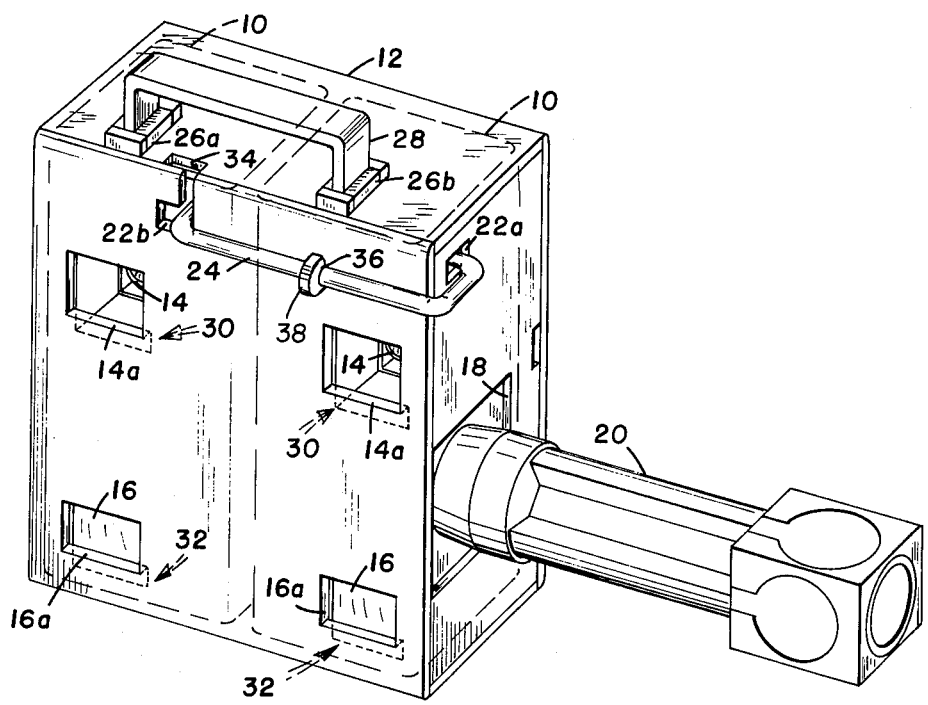
FIG. 1 is a perspective of one embodiment of a holder apparatus of the present invention.

Practice of the present invention begins with the apparatus of the invention as shown in FIG. 1 in use with two fixed-focus cameras 10 mounted in a holder designated generally as 12. The cameras 10 may be of the Kodak Instamatic 10, 20, 30, or 40 series, of the Minolta 70 series, or of the Keystone 20 series. Regardless of the particular camera employed, it is of greatest interest to note that the cameras are of inexpensive design and produce inexpensive slide transparencies which, when made using the present holder 12, can be fitted into standard stereo reel mounts for viewing with standard stereo viewers. As is seen in FIG. 1, the two cameras 10 are positioned with their longitudinal axes oriented vertically, lenses 14 of the cameras being spaced apart a given distance which can be varied between 1.5 to 4 inches. The distance between the lenses 14 is the interaxial distance and corresponds to the distance between the human eyes, or the interocular distance. This interaxial distance must not exceed 4 inches but can be varied within an approximately 2.5 inch range less than 4 inches. The holder 12 as shown in FIG. 1 maintains the lenses 14 a fixed distance apart. However, as will be described relative to FIG. 3, this spacing can be adjusted by the use of additional structure.

The holder 12 as shown houses the cameras 10 in an enclosed space. It should be pointed out that a simple frame could be used as long as the cameras 10 are maintained at the proper interaxial distance and are held vertically as shown. Enclosure of the cameras 10 by the holder 12 of FIG. 1 requires design of the holder to provide openings 14a for the lenses 14 of the cameras as well as openings 16a for camera viewfinders 16. An opening 18 is also provided for a flash attachment 20 to one of the carmeras 10 to allow flash photography. Additional openings 22a and 22b are provided to allow attachment of an external film advance bar 24 to the film advance mechanisms on the cameras 10. The openings 14a, 15b, 16a, 16b, 18, 22a, 22b, 26a, and 26b are provided to conform to the articular design of the cameras 10. Use of Kodak Instamatic 10 cameras, for example, will necessitate a differing pattern of openings in the holder 12 as compared to cameras of the Kodak Instamatic 20 series. Such modifications are matters of simple engineering and are well within the art.

It is to be particularly noted that the cameras 10 are disposed vertically relative to each other and to a "horizontal" reference, i.e., the longitudinal axes of the cameras and of the film plane are parallel and are vertical with respect to a horizontal reference plane. Prior stereophotographic apparatus have disposed the two cameras in a horizontal, "side-by-side" arrangement. It has been found according to the present invention that the slide transparencies produced by disposing the cameras 10 in the vertical orientation just described and shown in FIG. 1 can be fitted into standard 3-D reel mounts without the necessity for cropping the sides of the transparencies. Thus, interaxial spacing between the image on the transparencies are properly "in register." Without cropping stereo alignment, or fusion, of the images on the transparencies is present without the need for aligning homologous points by manual cropping. The slide transparencies produced with the apparatus of FIG. 1 are cropped along the top (or bottom) frame-line, and once in the picture area, thereof in order to fit the transparencies into a standard reel mount as will be described hereinafter. It is of importance to note that only one cut off in the picture area of each transparency is necessary to provide a proper fit.

The holder 12 when used with the two cameras 10 thus provides to the unskilled amateur the ability to photograph 3-D stereo slide transparencies at low cost, with relatively inexpensive equipment, and without the need for specialized processing. The cameras 10 can be inexpensively obtained, while the holder 12 is expensively manufactured.

The lenses 14 and viewfinders 16 may be partially masked by judiciously conforming the sizes of the openings 14a, 14b, 16a and 15b, as is seen generally at 30 and at 32 in FIG. 1. The portions of the holder 12 which mask portions of the lenses 14 are sized to produce masked portions of the lenses 14 are sized to produce masked portions on the slide transparencies, which are to be cropped from the transparencies as will be described hereinafter. The viewfinders 16 are correspondingly masked so that the portion of the transparencies which are to be unused can be visualized during the photographic process.

The release bar 24 can be cast in one solid piece by providing an opening 34 in the holder 12 and an aperture 36 in retaining ring 38. The release bar 28 is assembled onto the holder 12 by sliding one end of the bar through the opening 34 while the opposite end of the bar is held within the opening 22a. The advance bar 28 will snap into place when the ends thereof align with the openings 26a and 26b. The ends of the release bar 24 are simply inserted into the openings 22a and 22b.

Figure 2A:
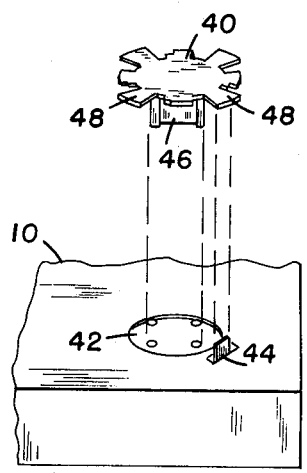
FIGS. 2a and 2b are perspectives of an adapter used for flash stereophotography according to the invention.
Figure 2B:
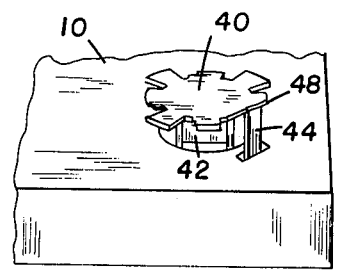

Indoor photography or other conditions requiring the use of the flash attachment 20 necessitate the use of an adapter 40 shown in FIGS. 2a and 2b. The adapter 40 is installed in the flashcube socket 42 of the camera 10 which is not provided with the flash attachment 20. The adapter 40 compensates in the flashless camera for mechanical resistance in the release mechanism of the camera with the flash attachment 20. Flash photography with the present apparatus would not be possible without the adaptor 40 since the resistance in the camera 10 with flash caused by use of the attachment 20 imbalances the simultaneous operation of the two cameras 10.

Thus, the two cameras 10 would not expose their films simultaneously, one camera exposing during the flash and the other camera exposing at a fraction of a second prior to the flash. The second camera 10 would thus not properly expose its film. The socket 42 is seen in FIG. 2a to be associated with an activating bar 44 which protrudes from the camera to activate, under normal conditions of use, a flashcube. The adapter 40 is shown to be conformed into essentially the shape of the lower portions of a conventional flashcube, a male plug portion 46 fitting into the socket 42. Overhangs 48 formed of an elastic plastic extend from the body of the adapter, on of the overhangs contacting the bar 44 to resist movement of the bar with a physical resistance equal to the resistance which a conventional flashcube would apply to the bar. The overhang 48 is elastic so that it can bend, as shown in FIG. 2b, on operation of the cameras 10, until release occurs in both cameras. Thus, release in both cameras is activated simultaneously during the split-second flash of the attachment 18 and both transparencies are exposed with the use of one flashcube. The adapter 40 need not be conformed exactly as shown, it being only necessary to provide a device capable of resisting the bar 44 as described.

Figure 3:
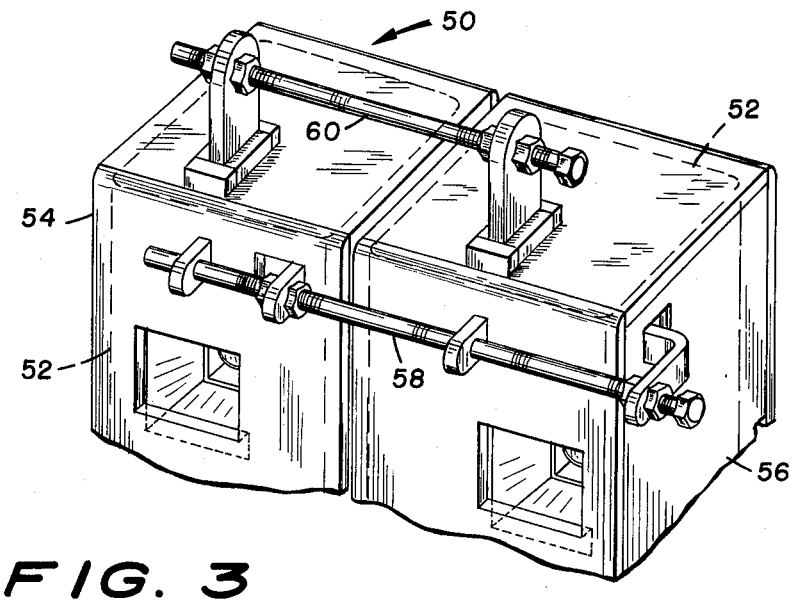
FIG. 3 is a perspective of a portion of a holder apparatus capable of interaxial adjustment.

FIG. 3 illustrates an adjustable holder 50 wherein the interaxial spacing between cameras 52 can be changed in a range between 1½ to 4. Effectively, the holder 50 is comprised of two separate housing portions 54 and 56 joined together by an extensable release bar 58 and advance bar 60. The bars 58 and 60 can be made adjustable in length in a variety of ways such as by the nut-and-bolt screw arrangement shown in FIG. 3.

Figure 4A:
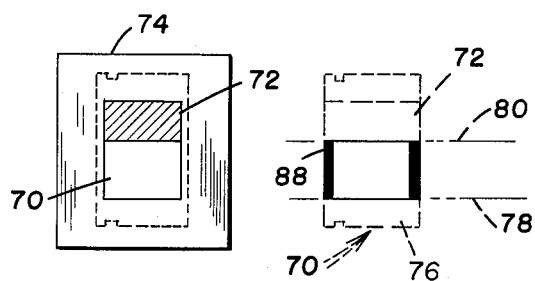
FIG. 4a and 4b are schematics illustrating the major steps involved in the method of producing stereo photographs according to the invention; and, FIGS. 5a and 5b show a cropping device incorporated in the camera holder.
Figure 4B:
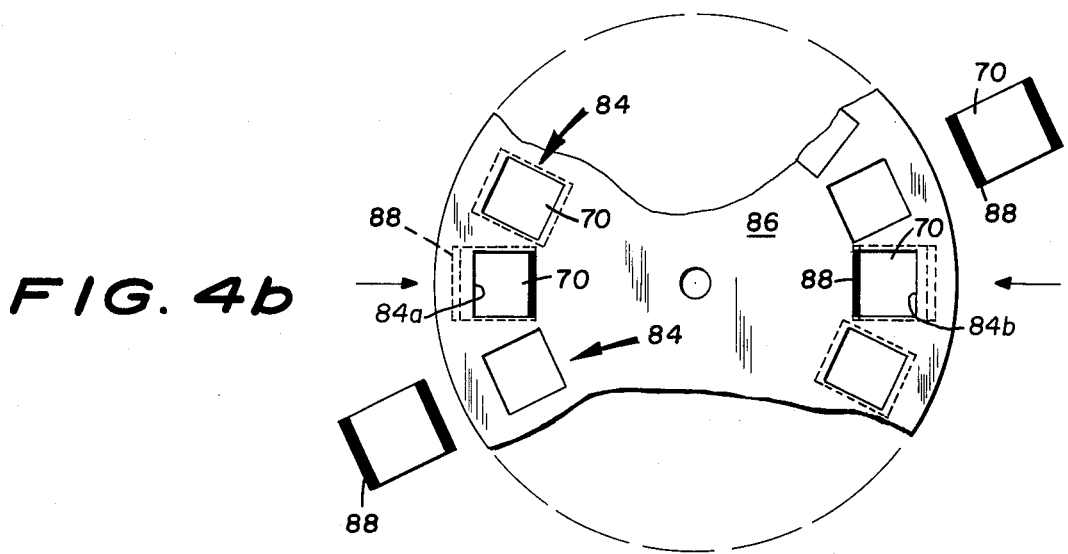

The slide transparencies made with the cameras 10 and holder 12 are cropped and fitted into a standard reel mount as shown in FIGS. 4a and 4b. A slide transparency 70 is shown in FIG. 4a as it would be received from a commercial slide developer with a portion of the transparency 70 is masked at 72 due to the provision of a portion of the holder 12 over the lens 14 of the camera 10 which exposed the transparency 70. To prepare the transparency for stereo viewing, it is removed from its commercial mount 74 and cropped. An important feature of the invention is that cropping is done in a manner accomplishable by an unskilled amateur. A clear area 76 at one end of the transparency 70 is cut along line 78 such as with a knife or scissors. The unexposed portion 72 of the transparency is then cut from the transparency along line 80. Referring to FIG. 4b, a cutting-edge (not shown) is then used to separate the two perimetrical edges in apertures 84 on a standard 3-D reel mount 86. A reel mount such as the mount 86 is formed with left and right apertures 84a and 84d to accomodate the two transparencies 70 which together form the sterophotograph. The cropped transparencies 70 are inserted into the apertures 84a and 84b, the left and right transparencies (based on orientation of the orignal photographic process) fitting into the left and right apertures 84a and 84b. The transparencies 70 are inserted into the apertures until the dark margin 88 of the right transparency 70 and an equal amount of the dark margin 88 on the left transparency 70 is obscured as shown in FIG. 46. The transparencies are thus ready to be viewed on a standard 3-D viewer, the stereophotographs having been made with relatively inexpensive equipment and without the need for expert cropping and mounting of the slide transparencies 70.

Figure 5A:
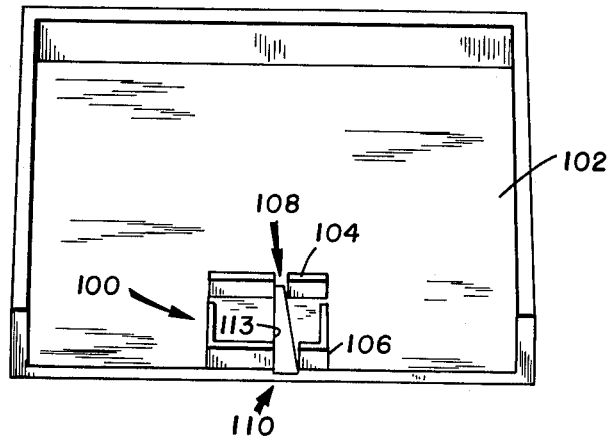
Figure 5B:
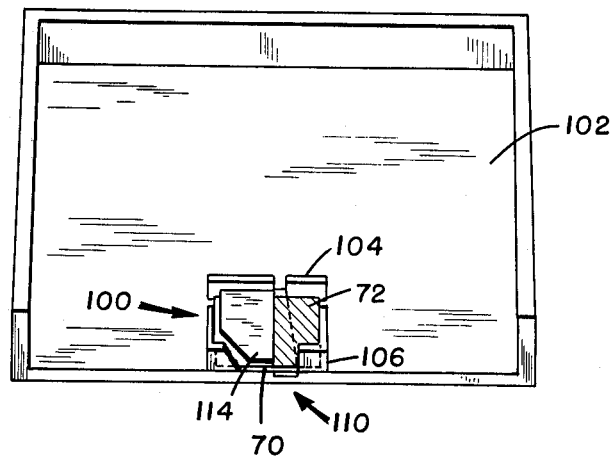

Referring now to FIGS. 5a and 5b, a cropping device 100 is shown which may conveniently incorporated as part of holder 12. As seen in FIG. 5a, the cropping device 100 is comprised of a planar base portion 102 (constituting part of the holder) which has raised strips 104 and 106 disposed in a generally rectangular pattern molded into the base for receiving the transparency 70 within the rectangular space defined by said strips 104 and 106. The strips 104 and 106 have aligned openings 108 and 110 therein which are located as described below, and define an edge 113. This facilitates use of a razor or other small blade to crop the transparency 70. The edge 113, along with those portions of the strips 104 and 106 on the left of the edge 113 define a space which exactly equals the exposed portion of the transparency 70. Thus, when the partially cropped transparency 70 is fitted into the full space defined by the strips 104 and 106, as seen in FIG. 5b, the line 80 on said transparency (see FIG. 4a) aligns with the edge 113. This serves as a guide to score or cut the transparency along the line 80.

A guide 114 flexibly attached to the base portion is positioned over the exposed portion of the transparency 70 further to guide the cutting instrument. The cropped transparency is then removed from the cropping device 100 and fitted into the reel mount 86 as described above with reference to FIG. 4b.

What is claimed is:

1. In combination with two fixed-focus cameras, apparatus for producing stereo photographs, comprising:
    holder means for mounting the two cameras at a predetermined interaxial spacing, the cameras being mounted with the longitudinal axes of their respective film planes disposed parallel to each other and essentially vertical with respect to a horizontal reference plane when in use:
    release means for simultaneously activating the two cameras;
    advance means for simultaneously advancing the film in each of the two cameras;
    said holder means being formed of two housing portions, one housing portion for each camera, the housing portions being coupled together in a linearly adjustable manner so that the interaxial spacing between the cameras can be adjusted, the means coupling the housing portions comprising linearly adjustable means on the release means and on the advance means, said linearly adjustable means said linearly adjustable means comprising a threaded release bar and a threaded advance bar each having mateingly threaded nut means thereon for adjusting the interaxial spacing between the cameras.

2. A method for producing stereo photographs, comprising:
    providing two fixed-focus cameras of the 110 type;
    positioning the cameras at a predetermined interaxial spacing relative to each other and with the longitudinal axes of their respective film planes disposed substantially parallel to each other, essentially vertical with respect to a horizontal reference plane and horizontally spaced apart a distance substantially equivalent to said predetermined interaxial spacing;
    simultaneously activating the two cameras when so positioned;
    developing slide transparencies taken by the cameras when said cameras are oriented in said relative positions;
    cropping the slide transparencies only along horizontal edges thereof; and
    inserting the cropped slide transparencies into opposite apertures of a standard stereo reel mount.

3. The method of claim 1 and further comprising the step of:
    masking portions of the lenses and viewfinders of the two cameras during operation of the cameras.

4. Apparatus for producing sterophotographs adapted for use in standard Viewmaster 3-D reel mounts comprising
    two fixed-focus cameras of the 110 type;
    holder means for mounting the cameras at a predetermined interaxial spacing, the cameras being mounted such that, when in use, the longitudinal axes of their respective film planes are disposed substantially parallel to each other, essentially vertical with respect to a horizontal reference plane and horizontally spaced apart a distance substantially equivalent to said predetermined interaxial spacing;
    release means for simultaneously actuating the two cameras; and
    advance means for simultaneously advancing the film in each of the two cameras.

5. The apparatus of claim 4, wherein said holder means comprises a unitary housing within which the cameras are mounted with a fixed interaxial spacing, 6. The apparatus of claim 4, wherein said release and advance means each include a linearly actuated bar member.

7. The apparatus of claim 4, wherein said holder means comprises a housing, said advance means and release means being mounted exteriorly of said housing and comprising bar members extending through openings in said housing into operative engagement with the respective advance and release mechanisms of the cameras.

8. Apparatus according to claim 4, wherein said cameras have lenses and viewfinders and including means for masking the light from predetermined portions of said lenses and viewfinders of said cameras, said predetermined masked portions of said lenses defining a cropping line on each of the film transparencies produced from the simultaneous exposure of the film in each camera.

9. Apparatus according to claim 4, wherein said holder means includes two housing portions, one of said two cameras being mounted in a respective one of said two housing portions, means for coupling said housing portions together in a linearly adjustable manner for adjusting the interaxial spacing between said cameras, said coupling means comprising linearly adjustable means on both of said release means and advance means.

* * * * *